United States Patent
Baumann et al.

(10) Patent No.: US 8,563,187 B2
(45) Date of Patent: Oct. 22, 2013

(54) METHOD AND DEVICE FOR IMPROVING THE SERVICE LIFE OF A FUEL CELL AT TRANSITIONS IN OPERATION

(75) Inventors: Frank Baumann, Mundelsheim (DE); Florian Wahl, Lohr (DE); Arthur Schaefert, Buehlertal (DE); Sebastian Maass, Stuttgart (DE); Jens Intorp, Stuttgart (DE); Gunter Wiedemann, Ludwigsburg (DE); Wolfgang Friede, Ludwigsburg (DE); Uwe Limbeck, Kirchheim Unter Teck (DE)

(73) Assignee: Robert Bosch GmbH, Stuttgart (DE)

( * ) Notice: Subject to any disclaimer, the term of this patent is extended or adjusted under 35 U.S.C. 154(b) by 785 days.

(21) Appl. No.: 12/356,782

(22) Filed: Jan. 21, 2009

(65) Prior Publication Data

US 2009/0263683 A1 Oct. 22, 2009

(30) Foreign Application Priority Data

Jan. 22, 2008 (DE) .................. 10 2008 005 530

(51) Int. Cl.
*H01M 8/04* (2006.01)
(52) U.S. Cl.
USPC ............ 429/429; 429/431; 429/432; 429/444
(58) Field of Classification Search
USPC .................................................. 429/428–451
See application file for complete search history.

(56) References Cited

U.S. PATENT DOCUMENTS

| | | | |
|---|---|---|---|
| 6,913,845 B2 * | 7/2005 | Bekkedahl et al. | 429/429 |
| 2002/0076583 A1 * | 6/2002 | Reiser et al. | 429/13 |
| 2003/0129462 A1 * | 7/2003 | Yang et al. | 429/17 |
| 2005/0208358 A1 * | 9/2005 | Nishimura et al. | 429/34 |
| 2005/0260470 A1 * | 11/2005 | Nezu et al. | 429/21 |
| 2006/0188765 A1 * | 8/2006 | Matsuzaki et al. | 429/23 |
| 2006/0240293 A1 | 10/2006 | Kocha | |
| 2006/0280977 A1 * | 12/2006 | Sakajo et al. | 429/23 |
| 2007/0092772 A1 * | 4/2007 | Nishimura et al. | 429/23 |
| 2007/0122668 A1 | 5/2007 | Suzuki et al. | |
| 2008/0038602 A1 * | 2/2008 | Yu et al. | 429/22 |
| 2008/0044694 A1 * | 2/2008 | Lee et al. | 429/13 |

* cited by examiner

*Primary Examiner* — Raymond Alejandro
*Assistant Examiner* — Helen McDermott
(74) *Attorney, Agent, or Firm* — Michael Best & Friedrich LLP

(57) ABSTRACT

The subject of the present invention relates to a method and a protector for reducing degradation of fuel cell systems at transitions in operation, in particular at electrodes or catalysts in a combustion chamber of a stack of a PEM fuel cell system in startup and shutoff events of the fuel cell system. A switchable material delivery device is provided for varying a delivery of material to the fuel cell system, so that a transition from a first state of the fuel cell system to a second state of the fuel cell system can be initiated, such that a potential difference between different electrodes can be effected. At least one reducing mechanism is provided for reducing the potential difference between the different electrodes during the transition, in which the reducing mechanism includes at least one compensating device for an unequal gas distribution by reducing the proportions causing degradation, to reduce degradation. The compensation device includes at least one short-circuiting unit, with which the different electrodes can be short-circuited, in order to reduce the potential difference.

7 Claims, 1 Drawing Sheet

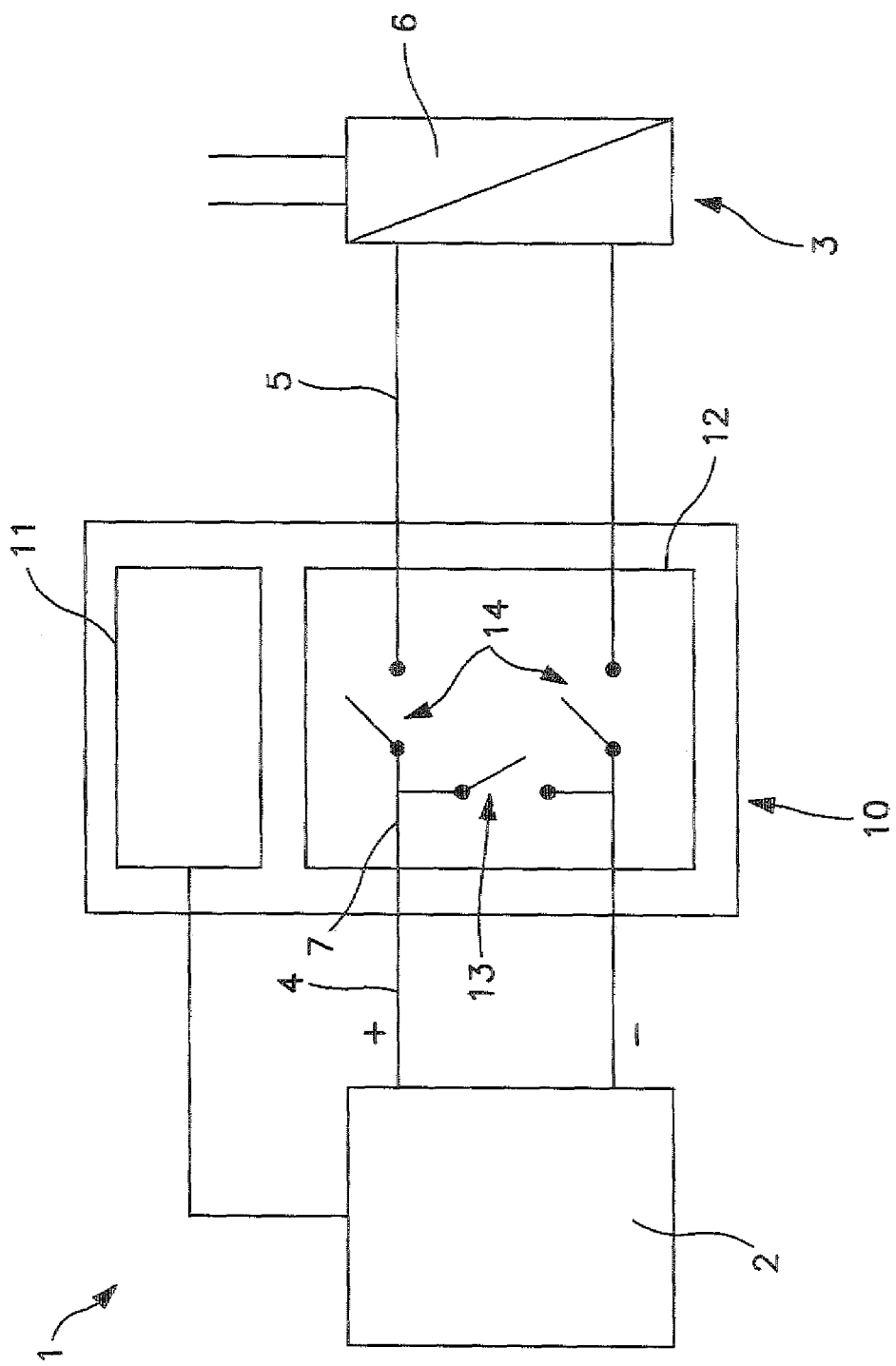

METHOD AND DEVICE FOR IMPROVING THE SERVICE LIFE OF A FUEL CELL AT TRANSITIONS IN OPERATION

CROSS-REFERENCE TO RELATED APPLICATIONS

This application is based on German Patent Application 10 2008 005 530.1 filed Jan. 22, 2008, upon which priority is claimed.

BACKGROUND OF THE INVENTION

1. Field of the Invention

The invention relates to a method for reducing degradation of fuel cell systems at transitions in operation. The invention further relates to a protector for reducing the degradation of fuel cell systems at transitions in operation. The invention moreover relates to a fuel cell system having at least one fuel cell and an electrical network connected electrically to it.

2. Description of the Prior Art

In an energy generation by means of fuel cells, in particular PEM fuel cells, increased wear at the electrodes, especially the cathode, occurs particularly as a result of transitions from one operating state to a stopped state and vice versa. In a stopped state, because of the gas-permeable membrane of the fuel cell, air and hence oxygen diffuse into the anode and cathode chambers, for lack of hermetic sealing. At the transition to the operating mode, that is, upon (re)starting the fuel cell system, fuel and in particular hydrogen is metered into the air- and hence oxygen-containing anode chamber, and as a result a hydrogen-air front develops, which propagates over the entire active surface and along the surface. At this hydrogen-air front, potential shifts occur, the effects of which range from the deactivation to the destruction of the diametrically opposed cathode in this area from oxidation of a carbon substrate, by the following equation:

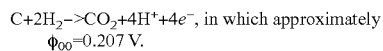

$C+2H_2 \rightarrow CO_2+4H^++4e^-$, in which approximately $\phi_{00}=0.207$ V.

This mechanism is based on the fact that oxygen present at the anode establishes the potential equilibrium of the oxygen reaction at the phase boundary of the electrode and the electrolyte. Since the membrane potential represents the reference potential of the electrochemical electrode potential, the electrochemical potential of the anode and cathode increases accordingly. The potential increase is especially critical at the cathode, since the cathode already has a higher potential. Thus at the cathode, potentials can be reached that can amount to substantially more than 1.2 V. Such high potentials can lead to oxidation of the carbon substrate and dissolution of the existing platinum catalyst. At the anode, potentials of up to 1.0 V are reached. This potential can lead to the dissolution of ruthenium, for instance, that is present for increasing the CO tolerance. Because of the shunt conductance of the typically thin electrolyte membrane, such as a membrane made of Nafion®, the protein deficiency cannot be compensated for. The potential increase or excessive increase cannot be measured from outside, that is, between the electrodes.

After a shutoff or shutdown of the fuel cell system, (ambient) air from the cathode inlets and outlets and through the fuel cell stack seal can diffuse into the anode chamber and lead to a potential shift because of locally different oxygen concentrations.

In the prior art, principles for reducing the degradation are described. For instance, methods are described in which the cathode path is closed in airtight fashion, or in which the fuel cell system is operated galvanostatically. Alternatively, the fuel metering can be done at different speeds. All these solutions to the problem do not efficiently prevent degradation, since despite everything, potential differences are still present.

OBJECT AND SUMMARY OF THE INVENTION

Based on the prior art discussed above, it is an object of the present invention to create a method, a device, and a fuel cell system that offer effective degradation protection and in particular effectively reduce or prevent the occurrence of damaging potential differences between the electrodes. It is also an object of the present invention to make the protection against degradation possible in a simple and easily accomplished way.

The present objects and further objects are attained by a method according to the invention, a protector according to the invention, and a fuel cell system according to the invention.

The invention includes the technical teaching that in a method for reducing degradation of fuel cell systems at transitions in operation, in particular at electrodes or catalysts in a combustion chamber of a stack of a PEM fuel cell system in startup and shutoff events of the fuel cell system, the following steps are included: varying a delivery of material to the fuel cell system, so that a transition from a first state of the fuel cell system to a second state of the fuel cell system is initiated, whereupon a potential difference between different electrodes is effected, reducing the potential difference between the different electrodes, and reaching the second state, whereupon the reducing step includes the step of compensating for an unequal gas distribution by reducing the proportions that cause degradation, and the compensation step includes the step of short-circuiting the different electrodes, in order to reduce the potential difference during the transition.

A fuel cell system according to the invention includes a plurality of fuel cells, which are connected to form a stack, or fuel cell stack. In the fuel cells, the electrodes (anode, cathode) are disposed in corresponding chambers. For better catalysis, the electrodes can be coated with catalysts, which for instance include a platinum material. The chambers in which the electrodes are located are not hermetically sealed off from the external environment, so that particularly during a stopped state of the fuel cell system, ambient air can penetrate into these chambers. When the fuel cell system is started, fuel is then metered into the chambers, or more precisely into an anode chamber. Consequently, the delivery of material is varied such that fuel is delivered. The fuel can be any suitable fuel and is preferably hydrogen. Because air and thus oxygen are already present in the anode chamber, a nonhomogeneous air mixture is created, which develops as a front along the anode. As a result, when the fuel cell system is put into operation, an unequal distribution of the gases occurs, especially at the anode and at the cathode. This in turn causes a potential difference between the cathode and the anode. Depending on the magnitude of the difference, the potential difference causes degradation of the cathode, and particularly of the catalyst of the cathode. Accordingly, after the switching of the fuel system, which includes not only the delivery of material but all the relevant steps in the transition from one operating state to another, the step of reducing the potential difference between the cathode and the anode is performed.

Once the potential difference has been substantially compensated for, the next step can be performed, namely reaching the second state. The first state can be an operating state, in which the fuel cell is being operated, or a stopped state, in which the fuel cell is not being operated. Correspondingly oppositely, the second state can be a stopped state or an operating state. The reducing step can be performed at each transition in operation, so that degradation is always avoided or at least sharply reduced. The reducing step includes compensating for the unequal gas distribution. This is effected in particular in that the degradation cause or degradation-causing substances at the electrodes are removed or avoided. According to the invention, this is done by short-circuiting the anode and the cathode. By the short-circuiting, oxygen present at the anode is consumed completely by a continued reaction. In the process, current continues to be generated and hence a potential difference as well, which can be removed from the electrodes via the short-circuit connection and made available for further use.

In an embodiment of the method according to the invention, it is also provided that the reducing step is always performed in the same way, both when the first state is an operating state and a stopped state and correspondingly when the second state is a stopped state or an operating state, so that upon startup and shutoff degradation is avoided in the same way. This means that switching a short-circuiting is done both on starting and on shutting down the fuel cell system. In this way, the reducing step can be executed in a simple way and used for each transition in operation.

A further embodiment provides that the short-circuiting step includes the step of acquiring operating parameters for determining the applied potential difference, in order to perform the short-circuiting as a function of the acquired operating parameters. In this way, an optimized compensation of potential differences is effected as a function of existing operating conditions. In particular, a further embodiment therefore provides that the acquisition step includes the step of detecting electrical operating parameters, such as current magnitude, resistance, voltage, and the like. In addition, still other parameters, such as oxygen concentration, fuel concentration, pressure, temperature, and the like can be acquired and processed in order to optimize the short-circuiting.

The potentiostatic consumption of the fuel causing degradation, such as the residual oxygen, has many advantages. The voltage of the fuel cell can be lowered, beginning at an operating voltage, down to 0.1V/cell in a controlled fashion. Since the supply of the fuel—such as air—is stopped at this instant (that is, the air compressor no longer pumps), the residual oxygen is consumed, which results in a drop in the electric current down to zero. At is instant, the fuel cell stack is completely oxygen-free, and all the oxygen adsorbates are consumed. The energy stored in the residual oxygen can be utilized as electric current and is not lost. In contrast to the galvanostatic consumption of the fuel causing degradation (that is, in contrast to predetermining a current), no fuel such as hydrogen is pumped electrochemically from the anode to the cathode, which would lead to hydrogen emission via the cathode. Instead, hydrogen, which is diffused molecularly via the readily gas-permeable membrane from the anode to the cathode, is even pumped back to the anode again electrochemically. In this way, in starting, no hydrogen emissions are created, which increases the operating safety. As soon as the current of the fuel cell stack has dropped to nearly zero, the potentiostatic control of the fuel cell stack is terminated and the short-circuit protection device is closed. The voltage is thus set to 0 V, and hence harmful electrode potentials during the startup and/or shutdown procedure and during the stopped state are averted.

It has proved advantageous to use a resistor network for the potentiostatic control of the voltage in the fuel cell stack. In potentiostatic adjustment of the voltage, it is likely that because of readily different internal resistances of the individual cells of the fuel cell stack, unequal and possibly even harmful individual-cell voltages will be established, which taken together result in the desired voltage. The parallel connection of ohmic resistors for each cell rectifier the individual-cell voltages, so that by potentiostatic adjustment of the voltage, the individual-cell voltages are adjusted in a defined way as well. The electric power loss via the resistor network is equivalent to the internal power loss of the fuel cell stack and is negligible.

In another embodiment, it is provided that the short-circuiting is performed in time-controlled fashion, and the short-circuiting is performed for a predeterminable time period. Hence it can be defined, for instance based on empirical or measured values, when and/or how long the short-circuiting is to be effected. Regulation by a combination of time control and the acquired operating parameters is equally possible.

Moreover, an embodiment of the method according to the invention provides that the first state is an operating state and the switching step includes a shutoff of the fuel delivery, and the reducing is performed until such time as substantially no fuel causing degradation is present at the anode any longer, and thus the potential difference is substantially compensated for. As a result of the shutoff of the fuel delivery, the residual fuel still present in the system is consumed until it is no longer or is hardly present any longer, and thus a "fuel depletion" is performed. The residual current thus generated can still be used, for instance for operating further devices in the fuel cell.

One exemplary embodiment of the method of the invention provides that the first state is a stopped state and the switching state includes activating the fuel delivery, and the reducing is performed until such time as substantially no oxidant that causes degradation is present at the cathode any longer, and thus the potential difference is substantially compensated for.

An exemplary embodiment further provides that the short-circuiting step includes the switchable connection of a short-circuit protection device disposed between electric lines on the anode and cathode sides. Via this short-circuit protection device, simple and reliable switching can be attained. The short-circuit protection device can be small in structure and can be integrated with further devices, for example a converter, such as a DC-DC converter.

The invention further includes the technical teaching that in a protector for reducing degradation of fuel cell systems at transitions in operation, in particular at electrodes or catalysts in a combustion chamber of a stack of a PEM fuel cell system in startup and shutoff events of the fuel cell system, the following are included: a switchable material delivery device for varying a delivery of material to the fuel cell system, so that a transition from a first state of the fuel cell system to a second state of the fuel cell system can be initiated, by which a potential difference between different electrodes can be effected; and at least one reducing mechanism for reducing the potential difference between the different electrodes during the transition, in which the reducing mechanism includes at least one device for compensating for an unequal gas distribution by reducing the proportions causing degradation, to reduce degradation; and the compensation device includes at least one short-circuiting unit, with which the different electrodes can be short-circuited, in order to reduce the potential difference. The short-circuiting unit can be any arbitrary device that makes a controlled short-circuiting possible. The short-circuiting is effected between different electrodes, that is, anode and a cathode. These are connected to one another electrically conductively, for instance via suitable elements.

In an embodiment of the invention, it is provided that the reducing mechanism is embodied such that it always acts in the same way, both when the first state is an operating state or a stopped state and correspondingly when the second state is a stopped state or an operating state and thus degradation is prevented in the same way both upon startup and upon shutoff. That is, different reducing mechanisms for running up to operating speed and down again for the fuel cell system are needed. The fundamental principle is the same for both yes of transition in operation.

A further advantageous embodiment of the protector of the invention provides that the reducing mechanism further includes at least one regulating device having at least one sensor unit for acquiring operating states and subsequently determining the potential difference applied, in order to perform an actuation of the short-circuit unit as a function of the operating states acquired. In this way, the potential compensation can be optimized.

In a further embodiment, it is provided that at least one of the sensor units is embodied for detecting electrical operating states, such as current magnitude, resistance, voltage, and the like. Still other operating states can moreover be acquired, such as substance concentration, substance ratio, fuel proportion, proportion of oxidant, temperature, pressure, and the like.

In a further advantageous embodiment, it is furthermore provided that the regulating device includes a time switch, for performing the short-circuiting in time-controlled fashion, and the time switch performs switching for a predeterminable time period. The time switching can be performed rigidly in accordance with a fixed, preprogrammed plan, or dynamically, that is, adapted to the existing conditions. In particular, the time switching can be performed as a function of the acquired operating parameters.

An exemplary embodiment of the protector of the invention furthermore provides that the delivery of material includes a fuel delivery, and the switching device is coupled with a fuel delivery, in order to effect a shutoff of the fuel delivery when the first state is an operating state, and the reducing means performs a reduction until such time as substantially no fuel causing degradation is present at an anode of the fuel cell system, and thus the potential difference is substantially compensated for. The fuel delivery can include hoses, conduits, injection nozzles, and the like. These can be blocked off, so that delivery is discontinued, via suitable blocking devices such as throttle restrictions, valves, flaps, slides, and the like.

A further exemplary embodiment provides that the switching device is coupled with a fuel delivery, in order to effect an activation of fuel delivery when the first state is a stopped state, and the reducing mechanism performs a reduction until such time as substantially no oxidant that causes degradation is present at an cathode of the fuel cell system, and thus the potential difference is substantially compensated for. As a result, "substance depletion" is performed, so that the residual substance still present in the system is consumed before the next transition in operation is initiated.

In another exemplary embodiment, it is furthermore provided that the short-circuit unit includes a switchable short-circuit protection device, which is disposed between electric lines on the anode and cathode sides. Still other short-circuit protection devices may be provided, which can be coupled accordingly to one another.

The invention further includes the technical teaching that in a fuel cell system having at least one fuel cell and an electrical network, connected electrical to the fuel cell, it is provided that the fuel cell has a protector according to the invention.

In a further advantageous embodiment of the fuel cell system of the invention, it is provided at least one short-circuit unit is disposed between the fuel cell and the electrical network, in order to short-circuit an anode of the fuel cell to a cathode of the fuel cell switchably. In this way, degradation of electrodes is prevented safely and reliably, so that the service life of a fuel cell system is lengthened.

BRIEF DESCRIPTION OF THE DRAWING

The invention will be better understood and further objects and advantages thereof will become more apparent from the ensuing detailed description of preferred embodiments taken in conjunction with the drawing, in which:

FIG. 1 schematically shows a systematic circuit diagram for a portion of a fuel cell system according to the invention.

DESCRIPTION OF THE PREFERRED EMBODIMENTS

The portion of the fuel cell system 1 of the invention shown in FIG. 1 includes a schematically shown fuel cell stack 2, an electrical network 3 embodied as a current network or high-voltage circuit, and a protector 10 by way of which the fuel cell stack 2 and the electrical network 3 are connected to one another. The fuel cell stack 2 includes a plurality of fuel cells, which are connected to form the fuel cell stack 2. From the fuel cell stack 2, two electric lines 4, in the case of FIG. 1, lead outward: one line that carries a positive voltage (+), and one line that carries a negative voltage (−).

The electrical network 3, in FIG. 1 shown also has two electric lines 5; one corresponding electric line of the fuel cell stack 2 carries a positive voltage, and the other carries a negative voltage. In FIG. 1 shown, a direct-current-to-direct-current converter 6 can also be seen, to which the electric lines 5 lead and which in the present case is embodied as a four-quadrant DC-DC converter. From this DC-DC converter 6, two electric lines carry the current or the voltages onward into the part of the electrical network 3 that is no longer shown here.

The electric lines 4, 5 are connected suitably to the protector 10. The protector 10 includes a reducing means 11, which includes means (not shown in further detail here) for compensating for unequal gas distribution in the electrode chambers by reducing the proportion of means causing degradation. The compensation means include a short-circuit means 12, shown, wth which electrodes of the fuel cell system 1 can be short-circuited. For that purpose, the short-circuit means 12 includes a switchable short-circuit protection device 13. Via the short-circuit protection device 13, the electric lines 4 from the fuel cell stack 2 can be short-circuited, so that potential differences at the different electrodes can be compensated for. In FIG. 1 show, the short-circuit protection device 13 is shown in an open position, so that in the present instance, the electrodes are not short-circuited.

Also in FIG. 1, two switches 14 are shown, by way of which the protector 10 can be connected to the electrical network 3 and disconnected from it. In the present case, the switches 14 are shown in an open position, so that the protector 10 and thus the fuel cell stack 2 are not connected to the electrical network 3. The switches 14 in the present case are embodied as primary protection devices with regard to the high-voltage circuit. The switching of the primary protection devices is effected via a regulating device, not shown here. If, via a corresponding switching device, also not shown here, a transition from one state of the fuel cell system 1 to another is brought about, then a suitable switching of the protection devices is regulated via the regulating device.

A description of the events upon transitions in operation will now be made. A transition from an operating state to a stopped state of the fuel cell system 1, called running down shutoff or shutdown, will first be described. First, the entire fuel cell system 1 is switched over to a potentiostatic mode of operation, that is, voltage-controlled operation. To that end, the fuel cell system 1 has means for determining a minimal voltage of the individual fuel cells U_ml and for determining the standard voltage deviation of the individual fuel cells from a mean value U_Stabw, in order to regulate an equal distribution of the cell voltages via suitable regulating mechanisms. This can be done for instance by means of individual monitoring or impedance-based system monitoring. The air still present in the fuel cell stack 2 still reacts and generates a residual current. That current is used for instance to maintain anode circulation or to supply other system consumers or parasitic consumers, for instance in a motor vehicle.

After the switchover, an existing compressor, by way of which a fuel delivery to the electrodes takes place, is switched off. As a result, a so-called oxygen depletion takes place in the fuel cell stack 2; that is, the residual oxygen present is reduced. In that process, a hydrogen recirculation blower of the anode continues to be operated, preferably at a slight overpressure, approximately in the range of 200 mbar. The stack voltage continues to be maintained, which assures fast and complete oxygen consumption. Moreover, further operation of further components, such as the recirculation blower, is possible only as a result of maintaining the stack voltage. Because of the switched potentiostatic mode of operation, only the electric current that is required to consume the residual oxygen in the electrode chamber flows through the fuel cell stack 2. Once the residual oxygen is consumed, the current reaches the value of zero, which is the signal for opening the protection devices between the fuel cell stack 2 and the electrical network 3 embodied as a high-voltage circuit, or under given technical preconditions, such as suitable multi-quadrant DC-DC converters, the signal reverses and reinforces return pumping of the hydrogen diffused via the membrane to the cathode, or the protons created there. This for instance avoids hydrogen emissions, so that the fuel cell stack 2 is operated as a proton pump. This advantage is attained by the potentiostatic depletion of the oxygen content. This function is necessary, if briefly after the shutdown a switch is made to the operating state again. The current generated from the residual oxygen can be used, by maintaining the voltage in the electrical network, to maintain the anode recirculation and to operate other system consumers and parasitic consumers, for instance in a motor vehicle. In the event that ambient temperatures are low, the power generated from the residual oxygen can be used for instance for an electric heater, for instance in a cooling loop. By means of the switching, the stack voltage is lowered in a controlled fashion via the DC-DC converter once the current for consuming the residual oxygen has reached zero or negative values and the shutdown procedure is to be continued. In the potentiostatic mode of operation, only the actually required current flows.

Airtight closure of the cathode path, for instance by means of valves or throttle valves, to avoid the diffusion of oxygen into the system is unnecessary. Nevertheless, suitable sealing means may be provided, for instance in the stopped state to avoid a further diffusion of oxygen into the fuel cell stack. The short-circuiting of the fuel cell stack 2 is effected by means of the hard-switched, short circuit protection device 13 and opening of the protection devices or switches 14. Once a required minimum voltage, such as U=100 mV, per cell is reached, the anode recirculation blower and the system controller are switched off. If the cathode inlets and outlets are then closed, oxygen diffuses only very slowly into the fuel cell stack 2 via the seals. This slow diffusion rate and the shutoff with hydrogen excess assure an oxygen-free fuel cell stack for at least a large part of the starting events of the fuel cell system 1. This is especially relevant particularly for a so-called warm start shortly after a shutoff, since because of the improved reaction kinetics these are especially harmful. By short-circuiting the fuel cell stack, any potential increase that may occur as a consequence of an unequal distribution of the fuels is avoided.

Events at the transition from a stopped state to an operating state, called as startup, runup, startup or switching on of the fuel cell system 1, will now be described. In the optimal case, the fuel cell stack is oxygen-free upon startup, and fuel can be metered into the fuel cell stack without risk of damage. After longer periods without operation, it cannot be assured that the fuel cell stack, or more precisely the electrode chambers, are oxygen-free. Since oxygen in combination with fuel causes a potential increase at the cathode upon startup, and hence cathode degradation can ensue, the cathode potential should be limited by means of a low cell voltage, and fuel/air fronts at the anode should be prevented by homogenization by means of a preliminary run of the recirculation blower.

Therefore, the fuel cell stack 2 is and remains short-circuited according to the invention, for instance by means of a protection device. The anode recirculation blower is then started and operated at a high rpm, in order to homogenize the residual gas in the anode chamber and to compensate for the water content of the membrane as well as to blow condensed water out of the anode flow field and the gas diffusion layer on the anode side. Any water in the liquid phase that is still present is in this way precipitated out in a condensate precipitator of the anode loop. Under optimal conditions, a mixture of hydrogen and nitrogen is located at the anode. In other case, oxygen has for instance diffused into the fuel cell stack 2, and in an unfavorable case, so much oxygen that there is no longer any hydrogen in the fuel cell stack 2. Instead, nitrogen and oxygen in an air ratio are located on the anode and the cathode. The recirculation housing causes a sufficiently high flow velocity that water is carried out of the conduits of the flow field and of the pore structure of the MEA, thus averting local hydrogen depletion.

Metering of fuel or hydrogen into the anode loop takes place until an overpressure has built up, for instance of 200-500 mbar. For this purpose, the anode loop can additionally be flushed in order to remove nitrogen and, if applicable, oxygen. To monitor the gas concentration, a suitable gas sensor system may be provided, which has a control unit by way of which flushing can be initiated. The high-voltage circuit protection devices are moreover closed, and the short-circuit connections are opened. Thus the fuel cell stack 2 and the electrical network 3 are connected. The stack voltage is adjusted via the DC-DC converter to correspond to a medium level of individual voltage, such as approximately 80 mV, and to a minimal voltage U_min, such as at least 0 mV.

The compressor is then started up, and the fuel cell stack is supplied with air. Because of the now increasing air metering, the load current of the fuel cell stack 2 rises. Once a limit value for electric current is reached, the predetermined stack voltage is increased, until the current and the voltage correspond to the set-point values. Optionally, a switchover takes place from the potentiostatic operating mode to the galvanostatic operating mode, as a function of the operational concept employed.

The electric current generated by the residual oxygen consumption can be fed into the electrical network 3 for precharging upon startup, or given a degree of hybridization, into a rechargeable battery to increase a load state (SOC, or state of charge).

In the shutdown mode, the steps up to the controlled lowering of the fuel cell stack voltage can be used as a so-called IDLE operating state (idling). As a result, the parasitic effects can be reduced in idling by shutting off the compressor. The main current consumers in this state are the recirculation blower at lesser power and the proton pump, whose power can amount to approximately 100 watts. These requisite power levels can already be finished using relatively small batteries. This kind of IDLE strategy increases the energy efficiency of the system by reducing the parasitic effect. In addition, by the operation of the proton pump, an accumulation of fuel, in this case hydrogen, at the cathode is avoided, so that the next time the compressor is ran up to speed, no hydrogen emissions occur.

In addition, after the step of the controlled lowering of the fuel cell stack voltage at shutdown, air flushing of the anode can be performed. This is possible among other reasons because at the cathode, in the case of a PEM fuel cell, only hydrogen and nitrogen are present; that is, an electrochemically noncritical state is realized. The air flushing of the anode has the advantage that at system standstill, that is, the stopped state, a defined, noncritical state is realized, namely air is present at the anode and the cathode. The stamp of the fuel cell system in accordance with the method of the invention is likewise noncritical.

The foregoing relates to preferred exemplary embodiments of the invention, it being understood that other variants and embodiments thereof are possible within the spirit and scope of the invention, the latter being defined by the appended claims.

We claim:

1. A method for reducing degradation of a fuel cell system at transitions in operation, the method comprising:
    initiating a transition from an operating state of the fuel cell system to a stopped state of the fuel cell system by varying a delivery of material to the fuel cell system, wherein varying the delivery of the material affects a potential difference between a first electrode and a second electrode in the fuel cell system;
    applying potentiostatic control of the fuel cell system after varying the delivery of the material;
    acquiring operating parameters of the fuel cell system while under the potentiostatic control; and
    selectively applying a short-circuit between the first electrode and the second electrode based on the acquired operating parameters in order to reduce the potential difference during the transition from the operating state to the stopped state and to compensate for an unequal gas distribution at the first electrode or the second electrode.

2. The method as defined by claim 1, wherein the short-circuit is applied in time-controlled fashion, and the short-circuit is applied for a predeterminable time period.

3. The method as defined by claim 1, wherein the short-circuit is applied by operating a switchable short-circuit protection device, which is disposed between and short circuits electric lines on both anode and cathode sides.

4. The method as defined by claim 1, wherein the potentiostatic control is applied and the short-circuit is selectively applied until substantially no fuel that causes degradation is present at an anode, and thus the potential difference is substantially compensated for.

5. A method for reducing degradation of a fuel cell system at transitions in operation, the method comprising:
    applying potentiostatic control of the fuel cell system while the fuel cell system is in a stopped state;
    acquiring operating parameters of the fuel cell system while under the potentiostatic control;
    selectively applying a short-circuit between a first electrode and a second electrode based on the acquired operating parameters; and
    initiating a transition from a stopped state of the fuel cell system to an operating state of the fuel cell system by varying a delivery of material to the fuel cell system, wherein varying the delivery of the material affects a potential difference between a first electrode and a second electrode in the fuel cell system.

6. The method as defined by claim 5, wherein varying the delivery of the material includes activating fuel delivery, and wherein the potentiostatic control is applied and the short-circuit is selectively applied until substantially no oxidant that causes degradation is present at a cathode, and thus the potential difference is substantially compensated for.

7. The method as defined by claim 5, wherein the short-circuit is applied by operating a switchable short-circuit protection device, which is disposed between and short circuits electric lines on both anode and cathode sides.

* * * * *